United States Patent [19]
Kernick et al.

[11] 3,733,538
[45] May 15, 1973

[54] APPARATUS FOR LIMITING INSTANTANEOUS INVERTER CURRENT

[75] Inventors: Andress Kernick, Murrysville, Pa.; Glenn Ernsberger, Worthington, Ohio

[73] Assignee: Westinghouse Electric Corporation, Pittsburgh, Pa.

[22] Filed: Mar. 28, 1972

[21] Appl. No.: 238,877

Related U.S. Application Data
[62] Division of Ser. No. 64,442, Aug. 17, 1970.

[52] U.S. Cl. ................321/45 C, 317/33 R, 321/14
[51] Int. Cl. ...........................H02m 1/18, H02h 7/10
[58] Field of Search ..............323/9; 317/20, 22, 317/30, 33, 50; 321/11, 13, 14, 45 C, 2

[56] References Cited

UNITED STATES PATENTS

| | | | |
|---|---|---|---|
| 3,320,514 | 5/1967 | Lawrence | 321/13 |
| 3,444,453 | 5/1967 | Peterson | 321/11 |
| 3,490,027 | 1/1970 | Galetto et al. | 321/11 X |
| 3,551,748 | 12/1970 | Maynard et al. | 321/11 X |
| 3,676,763 | 7/1971 | Tappeiner | 321/45 C |
| 3,683,264 | 8/1972 | Schieman et al. | 321/14 |

*Primary Examiner*—Gerald Goldberg
*Attorney*—F. H. Henson et al.

[57] ABSTRACT

The invention relates to a technique for limiting the peak transient currents in the power switches of an inverter wherein a current control circuit compares the current flow in the power switches of the inverter to a reference value and provides protective ON-OFF control of the power switches to prevent overload of the power switches. In the event the current flow through a power switch exceeds a predetermined value, the current control circuit overrides the main power switch ON-OFF control circuit and generates an inhibit signal which turns the power switch off for a period of time required to allow the current magnitude to decrease a predetermined amount at which time the current control circuit inhibit signal is removed and the main power switch ON-OFF control circuit resumes control of the power switch conduction.

3 Claims, 5 Drawing Figures

APPARATUS FOR LIMITING INSTANTANEOUS INVERTER CURRENT

CROSS REFERENCE TO RELATED APPLICATION

This application is a Division of copending patent application Ser. No. 64,442, entitled Apparatus for Limiting Instantaneous Inverter Current, filed Aug. 17, 1970 and assigned to the assignee of the present invention.

BACKGROUND OF THE INVENTION

In many power inverter circuits, current limiting is accomplished by sensing the power inverter output current, or load current, with a current transformer, rectifying and filtering the voltage developed across a burden resistor and comparing this voltage with a DC voltage reference in a voltage regulator circuit. While this prior art technique provides good steady state current limiting, it is generally insensitive to peak currents produced during short-circuit conditions as well as transient currents resulting from saturation of the inverter output transformer.

SUMMARY OF THE INVENTION

The invention overcomes the limitations of the prior art current limiting techniques by sensing the instantaneous value of the current flow through the power switches comprising the inverter rather than sensing the output load current of the inverter.

A current transformer is connected in the inverter circuit such that the current flow through the power switches passes through the primary winding of the current transformer. The current appearing across the secondary winding of the transformer is converted into a representative voltage signal and compared to a DC reference voltage input of a current control circuit. When the voltage signal corresponding to the current flow through the power switches exceeds the DC reference voltage, the current control circuit generates an inhibit signal which turns the power switches OFF and reduces the magnitude of the DC reference voltage a predetermined amount, i.e., 50–75 percent. Due to circuit and load inductances, the load current takes a finite period of time to decrease 50 to 75 percent. When the magnitude of the voltage signal corresponding to the current flow through the power switches decreases below the reduced DC reference voltage, the current control circuit removes the inhibit signal and restores the DC reference voltage to its original magnitude.

The invention will become more readily apparent from the following exemplary description in connection with the accompanying drawing.

DESCRIPTION OF THE PREFERRED EMBODIMENT

Figure 1:
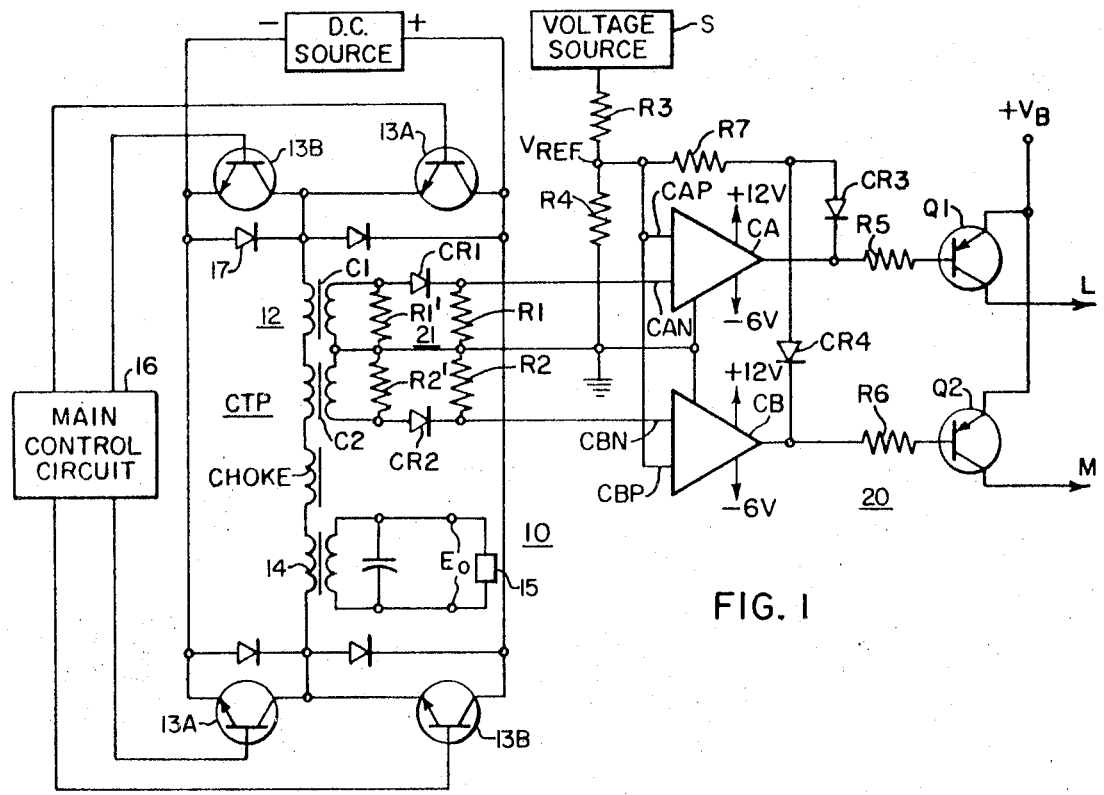
FIG. 1 is a schematic illustration of an embodiment of the invention using a full bridge inverter circuit.

Referring to FIG. 1, there is illustrated schematically a typical power inverter circuit 10 including a bridge type power stage 12 comprising transistor power switches 13, an output transformer 14 connected across a load 15, and a main control circuit 16 for controlling the conduction of the power switches 13 to develop the desired power inverter output voltage. While the power switches 13 are represented to be transistors, it is understood that other switching devices such as the SCR (silicon controlled rectifier) and the GCS (gate controlled switch) are equally suitable in this application. A current control circuit 20 is coupled to the power inverter circuit 10 by a current transformer CT and responds to transient current flow through the transistors 13 by generating an inhibit signal L and M to override the operation of the main control circuit 16 until the transient condition is brought under control. Numerous methods are available for implementing the sequential gating or firing function of the main control circuit 16. One such method is disclosed in the copending application Ser. No. 14,314, filed Feb. 26, 1970 and entitled Apparatus for Producing A Low Distortion Pulse Width Modulated Inverter Output.

Figure 2:
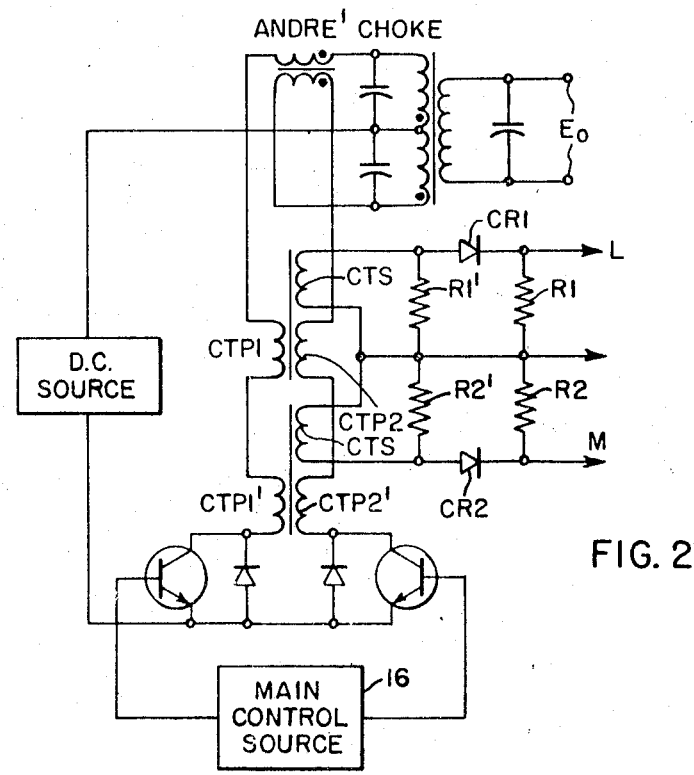
FIG. 2 is a schematic illustration of a center tap inverter circuit incorporating the invention.

The current transformer primary winding CTP is connected in series with the output transformer 14 of the power inverter circuit 10 so that the current flow through the transistor power switches 13 passes through the primary winding CTP. In the event a center-tapped parallel power stage is used instead of the bridge type illustrated, two primary windings CTP1 and CTP2 would be utilized, as illustrated in FIG. 2.

A single current transformer core is sufficient in the absence of a DC current component in the AC transient currents being monitored by the current control circuit 20. However unbalance in half cycle currents which results in a DC current component is often encountered as a result of saturation of the inverter output transformer. In order to prevent saturation of the current transformer CT, dual transformer cores C1 and C2 are used. The dual cores operate in an alternate manner in conjunction with the input circuit 21 of the current control circuit 20. The input circuit comprises resistor combinations R1-R1' and R2-R2' and associated diodes CR1 and CR2. While one core is developing an input signal across one resistor combination associated with a forward biased diode, the other core is resetting into a relatively high burden resistance resulting from the reverse bias condition of its associated diode. The capability of completely resetting the cores C1 and C2 during alternate half cycles, enables each core to deliver maximum volt-seconds during the respective active half cycle corresponding to the dot positive winding designations. In the absence of the DC current component, the dual cores C1 and C2 may be replaced with a single core and the burden resistors R1' and R2' eliminated.

The current control circuit 20 includes two comparator circuits CA and CB which function to generate the inhibit signals L and M respectively depending upon the polarity condition of the inverter power stage 12 at the instant of transistor overload.

The polarity sensitivity of the comparator circuits CA and CB is provided by the center-tapped secondary winding CTS of the current transformer CT. The current flow through transistors 13A during the positive half-cycle of the inverter output current is monitored by the circuitry associated with comparator circuit CA, and the current flow through transistors 13B during the negative half-cycle is monitored by the circuitry associated with the comparator circuit CB. The input circuit 21 which is connected across the center-tapped secondary winding CTS responds to the current flow through the diode rectifiers CR1 and CR2 by developing a voltage signal representative of transistor current flow corresponding to the positive and negative current polarity of the inverter power stage 12. The voltage signals developed across the resistor combinations R1-R1' and R2-R2' are supplied to the negative inputs CAN and CBN of the comparator circuits CA and CB respectively. The output of a DC voltage source S is applied to a resistor voltage divider circuit comprised of resistors R3 and R4 which develops a DC reference voltage $V_{REF}$ which is supplied to the positive input CAP and CBP of the comparator circuits CA and CB respectively. The comparator circuits CA and CB, which are illustrated in FIG. 1 as integrated circuit type comparator circuits, generate output signals of a polarity corresponding to the polarity of the larger input signal and of a magnitude sufficient to override the transistor conduction control of the main control circuit 16.

Under normal inverter output conditions the magnitude of the voltage signal developed across resistors R1-R1' and R2-R2' in response to the positive and negative polarity swings of the inverter output current is less than the magnitude of the reference voltage $V_{REF}$. The output of the comparator circuits CA and CB is therefore positive which results in the turning OFF of transistors Q1 and Q2 and the absence of inhibit signals L and M. In the absence of inhibit signals L and M the transistors 13A and 13B of the bridge type power stage 12 are permitted to conduct in accordance with the firing sequence established by the main control circuit 16.

In the event the magnitude of the voltage developed across resistor combination R1-R1' exceeds the magnitude of the reference voltage $V_{REF}$ as a result of an overload current flow through the transistors 13A, the output of the comparator circuit CA will be negative. This negative output voltage condition results in the forward biasing of the diode CR3 and the turning ON of transistor Q1 which results in the generation of an inhibit signal L. The forward biasing of diode CR3 provides a current flow through resistor R7 which functions to decrease the magnitude of the reference voltage $V_{REF}$ supplied to the positive input of the comparator circuits CA and CB. The combination of the resistor R7 and the diode CR3 forms a hysteresis type circuit. The attentuating effect of resistor R7 can be varied to provide a suitable current control deadband within which the inhibit signal A turns OFF the transistors 13A until the inverter output current as represented by the voltage developed across resistor combination R1-R1' drops below a predetermined value, i.e., a value corresponding to 50 percent of the maximum allowable inverter output current. An inverter output current depicting the transistor overload current control provided by circuit 20 is illustrated in FIG. 2.

Figure 3:
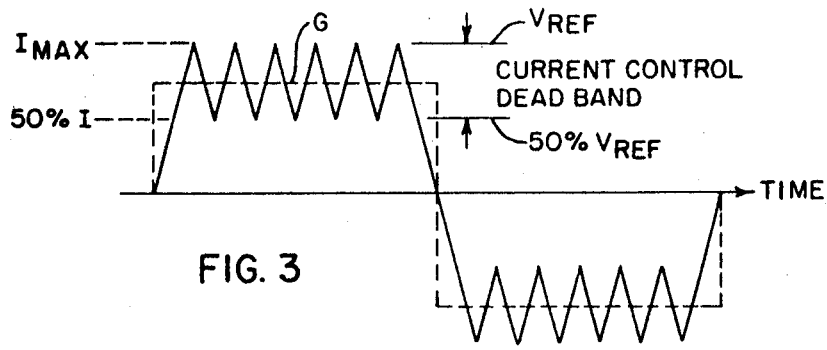
FIG. 3 is a waveform illustration of the operation of the invention.

Due to circuit and load inductances the current flow does not cease with turn-off of the transistors 13A, rather the primary winding CTP is subjected to a reverse current flow through a path provided by the commutating diodes 17 associated with transistors 13B. This reverse current flow through the diodes 17 appears the same as the forward current flow through the transistors 13A to the current transformer CT. The decaying current resulting from the generation of the inhibit signal flows through the primary winding CTP via a path provided by the commutating diodes associated with the opposite leg of the inverter circuit. When the voltage across the resistor combination R1-R1' drops below the reduced reference voltage 50 percent $V_{REF}$, the output of the comparator circuit CA again becomes positive thereby returning transistor Q1 to the OFF state and returning the magnitude of the reference to its original value $V_{REF}$. This cyclic current control provided by circuit 20 may be repeated many times during a half-cycle of the inverter output current as evidenced by the waveform of FIG. 3.

During the negative half-cycle of the output current, the current flow in the secondary winding CTS of a current transformer CT flows through diode CR2 and develops a voltage across the resistor combination R2-R2'. Excessive inverter output current flow represented by a voltage across resistors R2-R2' which exceeds the magnitude of the reference voltage $V_{REF}$ establishes a negative output from comparator circuit CB which turns transistor Q2 ON and forward biases diode CR4. The inhibit signal M produced by the ON condition of the transistor Q2 turns transistors 13B OFF until the voltage across resistors R2-R2' drops below the reduced reference voltage 50 percent $V_{REF}$ established by the current flow through resistor R7 and diode CR4.

Figure 4:
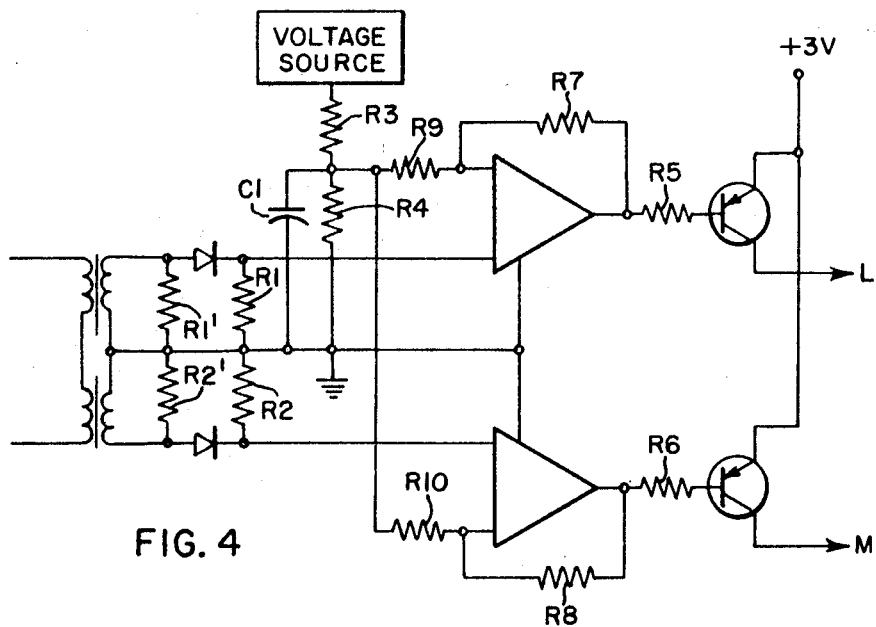
FIG. 4 is a modified version of the invention of FIG. 1.

Referring to FIG. 4 there is illustrated a modification of the current control circuit 20 which provides separate hysteresis circuits for each comparator circuit through the addition of resistors R8, R9, R10 and filter capacitor C1.

Figure 5:
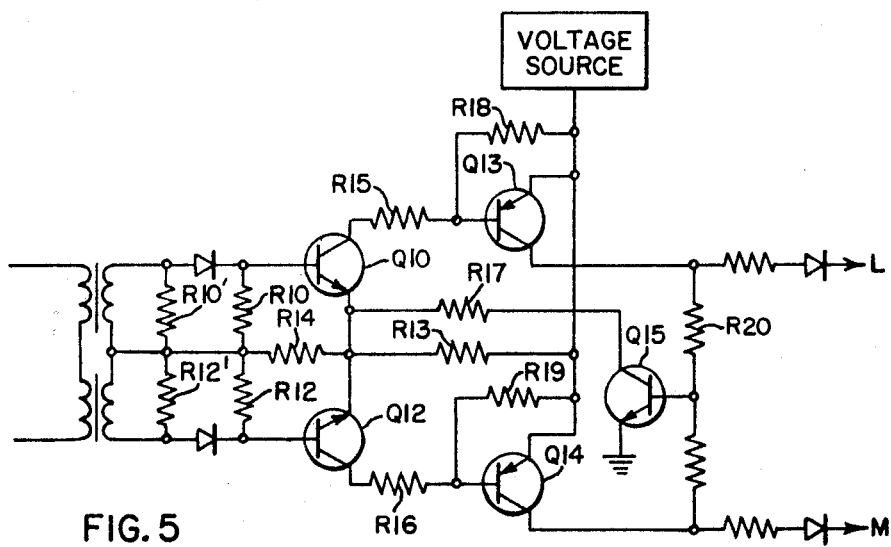
FIG. 5 is a discrete component representation of the invention of FIG. 1.

FIG. 5 illustrates a variation of the current control circuit 20 of FIG. 1 in which the integrated circuit comparators are replaced with discrete component circuits. At the present time this approach represents the last expensive method of providing the control required. A DC reference voltage is established at the emitter of transistors Q10 and Q12 by resistors R13 and R14. Assuming that an overload exists and the voltage across R10 causes Q10 to conduct through resistor R15 and the base of transistor Q13. This causes transistor Q13 to conduct current to the output L and also through resistor R20 into the base of the transistor Q15. When the transistor Q15 conducts current through the resistors R17 and R13, it lowers the reference voltage level at the emitters of the transistors Q10 and Q12 and provides the desired control current deadband or hysteresis. When the inverter output current magnitude decreases and the voltage developed across the resistor R10 can no longer maintain the transistor Q10 in a state of conduction, the transistors Q10, Q13 and Q15 turn OFF. When inverter output overload current occurs with the opposite polarity, transistors Q12, Q14 and Q15 conduct in a similar manner.

Experimental use of the current control circuits thus described have demonstrated instantaneous protection of inverter power thyristors from sudden applications of overload or short-circuit currents. Through the operation of the current control circuit the output inverter current approaches a square-wave G as shown in FIG. 2 when a short-circuit is applied to the inverter. This waveform provides a maximum possible RMS output current for a given peak switching current capability.

What we claim is:

1. In an electrical power apparatus comprising, a power stage including a plurality of ON-OFF conduction control power switch means, said power stage having an input and an output, an input voltage source operatively coupled to said input and an output circuit means operatively connected to said output, first circuit means for providing alternate ON-OFF conduction control of said conduction control power switch means, inductive means operatively connected in series between said power stage and said output circuit means, commutating diode means operatively associated with said ON-OFF conduction control power switch means to provide a conduction path through said inductive means for the residual decay current produced following termination of conduction of one or more of said ON-OFF conduction control power switch means, second circuit means operatively connected between said inductive means and said first circuit means to monitor the current flow through said inductive means, said second circuit means supplying an inhibit signal to said first means when the current flow through an ON conduction control power switch means exceeds a predetermined magnitude, said inhibit signal being applied to said first circuit means to override the ON-OFF conduction control of said ON power switch means and resulting in rendering said power switch OFF, said second circuit means further monitoring the decay current flowing in said commutating diodes following termination of conduction of said power switch means and removing said inhibit signal when the magnitude of said decaying current reaches a predetermined value.

2. In an electrical power apparatus as claimed in claim 1 wherein said second circuit means includes means for generating a reference signal of a predetermined magnitude and means for comparing the magnitude of said current flow through said inductive means to said reference signal, said second circuit means generating said inhibit signal when a predetermined relationship exists between the magnitude of said reference signal and the magnitude of said current.

3. In an electrical power apparatus as claimed in claim 1 wherein said output circuit means includes a power transformer having a primary winding connected in series with said inductive means.

* * * * *